Patented Feb. 24, 1925.

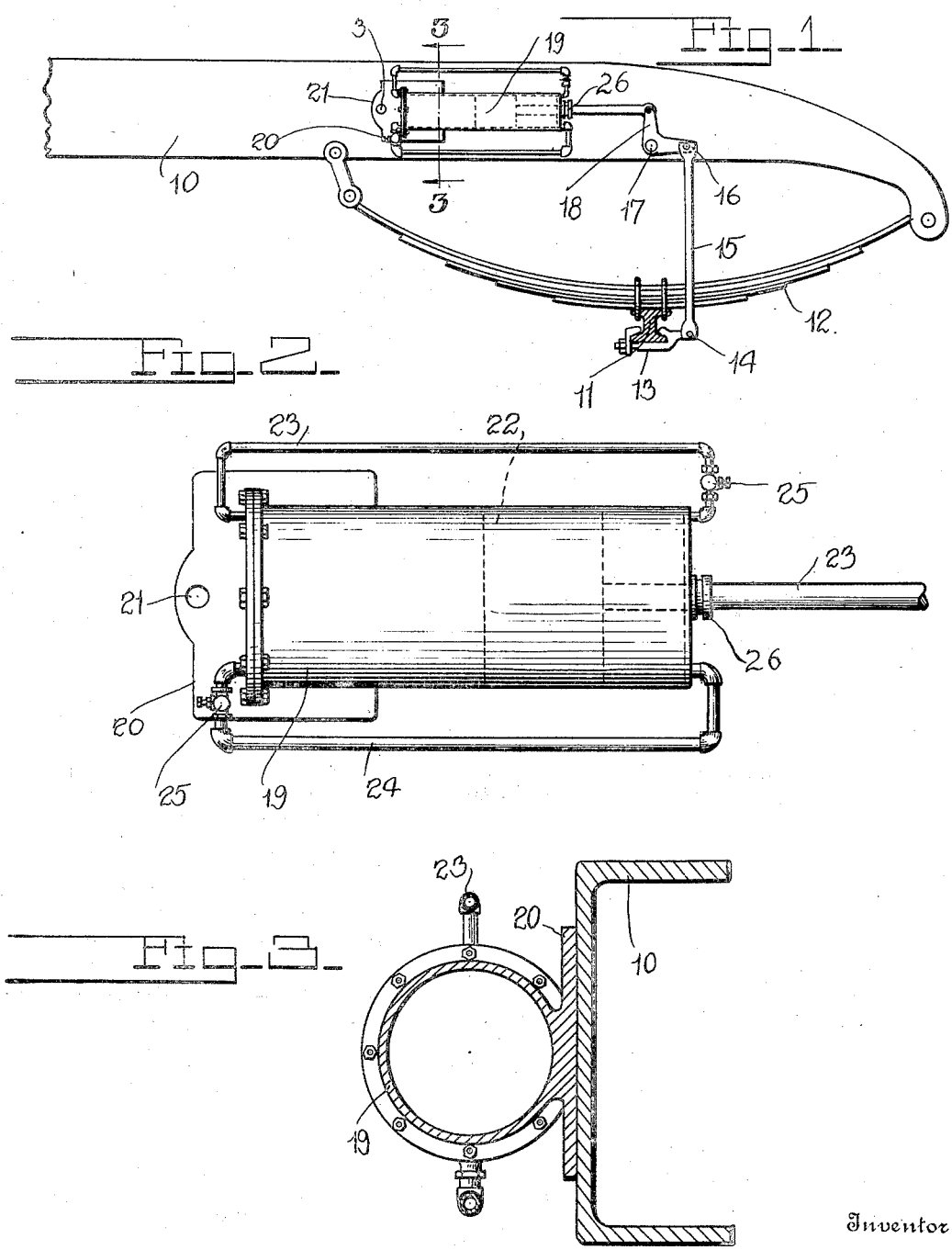

1,527,592

UNITED STATES PATENT OFFICE.

HARRY L. LIVEZEY, OF RENO, NEVADA.

SHOCK ABSORBER.

Application filed March 13, 1924. Serial No. 699,091.

*To all whom it may concern:*

Be it known that I, HARRY L. LIVEZEY, a citizen of the United States, residing at Reno, Nevada, have invented certain new and useful Improvements in Shock Absorbers, of which the following is a specification.

This invention relates to shock absorbers such as are used on automobiles and the like.

One important object of the invention is to improve the general construction of devices of this character.

A second important object of the invention is to provide an improved arrangement of pivoted dashpot cylinder in connection with devices of this character.

A third important object of the invention is to provide an improved by-pass arrangement for such cylinders.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a side elevation of a portion of an automobile frame showing an axle and its spring.

Figure 2 is an enlarged detail view of the cylinder used herewith.

Figure 3 is a detail section on the line 3—3 of Figure 1.

As herein disclosed the device is shown as applied to an automobile having a frame member 10 of the usual channel shape and provided with an axle 11 and semi-elliptic spring 12.

The invention itself consists of a clamp 13 which is fixed to the axle 11 and has a projecting arm 14 to which is connected by a ball and socket joint a vertical link 15 having its upper end connected to one arm of a bell crank lever 16, this arm preferably being horizontal or nearly so and the lever being pivoted at an angle 17 to the frame 10. This bell crank also has a substantially vertical arm 18. At 19 is a dashpot cylinder closed at each end and this cylinder is formed with a flat base 20, one end of said base being secured by a pivot bolt 21 to the frame 10 so that the cylinder may have its other end oscillated through a vertical arc. Within the cylinder is the usual piston 22 to which is connected the piston rod 23. This rod passes through the head of the cylinder remote from the pivot bolt and is connected to the vertical arm 18 of the bell crank.

It is to be noted that the link connection and the last mentioned connection are of preferably ball and socket joints or other forms of universal joints.

Connecting the heads of the cylinder 19 are by-pass pipes 23 and 24 and each of these pipes is provided with an adjustable check valve 25, said valves opening in opposite directions so that when the piston 22 travels toward one end of the cylinder one valve will be open and the other closed while, reverse movement of the piston reverses the position of the valves. The usual stuff box 26 is employed.

It is to be noted that the tube or pipe 23 is smaller than the pipe 24. This construction is used because it is desirable to allow ready movement of the piston 22 toward the pivot end of the cylinder while checking the movement to a great extent toward the other end. Thus the natural spring flexure which takes place when the vehicle wheel engages a projection on the ground is not checked but the rebound is checked and the shock thus absorbed.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. A shock absorber for vehicles having a frame and an axle spring; said absorber comprising a clip engageable with the vehicle axle, a link extending upwardly from said clip, a bell crank pivoted at its angle to said frame, said bell crank having one arm extending substantially horizontal and the other arm extending substantially vertical, said link having its upper end pivotally connected to said horizontal arm, a cylinder having one end pivoted to the frame to permit swinging of the opposite end of the cylinder through a vertical arc, said opposite end being adjacent the bell crank, a piston in said cylinder, a piston rod projecting from the cylinder and having its extremity connected to the vertical arm of the bell crank, a pair of by-pass pipes each connecting opposite ends of said cylinder, an adjustable check valve in each pipe, said check valves opening in opposite direction and one of said pipes being larger than the other.

2. In a device of the kind described, a cylinder having a piston and piston rod, said cylinder having a head at each end, said piston rod extending through one of said heads, a pair of by-pass pipes each connecting opposite ends of said cylinder, and an adjustable check valve in each pipe, said check valves opening in opposite directions and one of said pipes being larger than the other.

In testimony whereof I affix my signature.

HARRY L. LIVEZEY.